March 8, 1955 F. DER YUEN ET AL 2,703,724
SECTIONAL BAMBOO BUILDING STRUCTURE WITH COUPLING
Filed Aug. 11, 1949 2 Sheets-Sheet 1
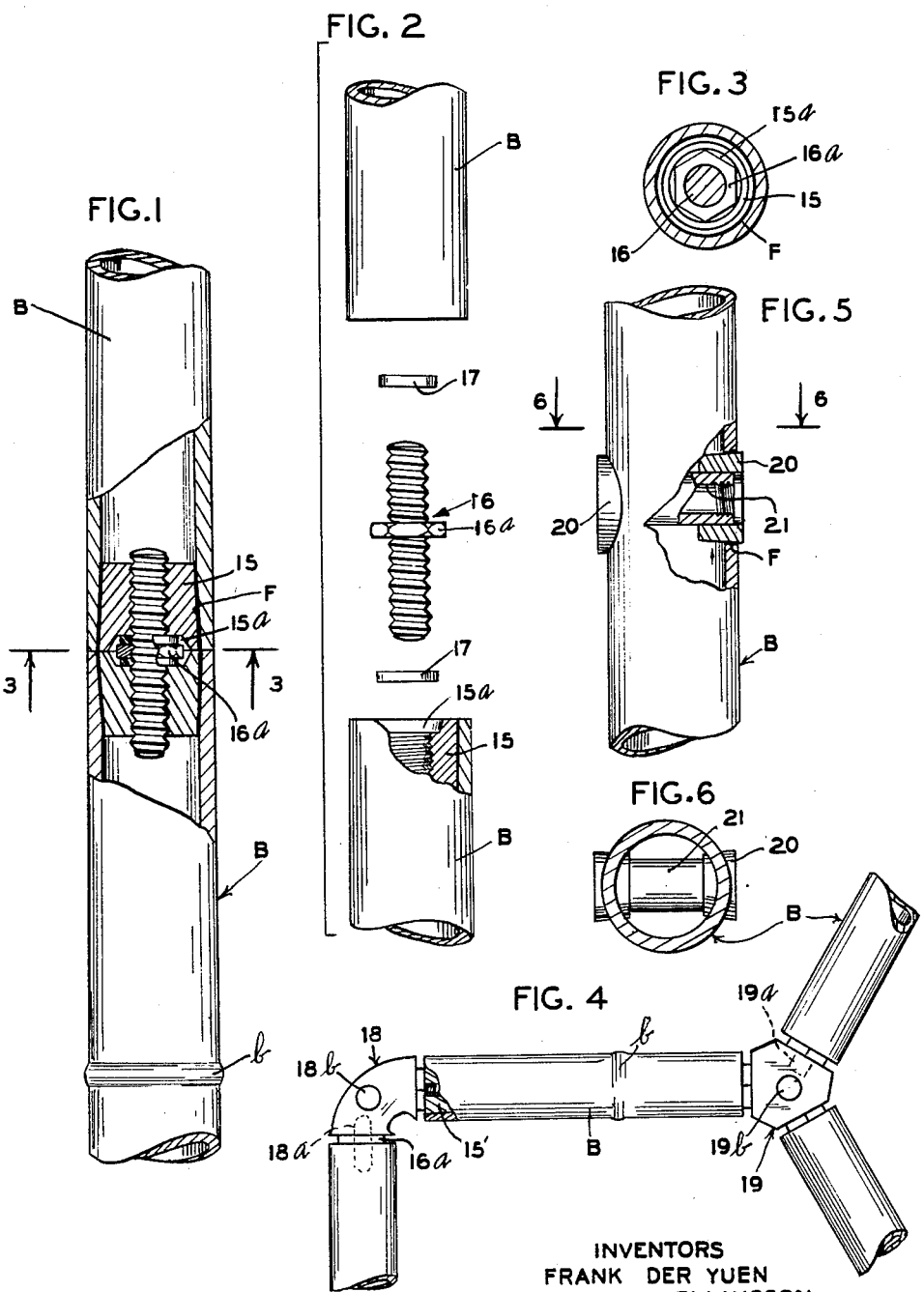
INVENTORS
FRANK DER YUEN
EMERY M. ELLINGSON
BY Williamson + Williamson
ATTORNEYS

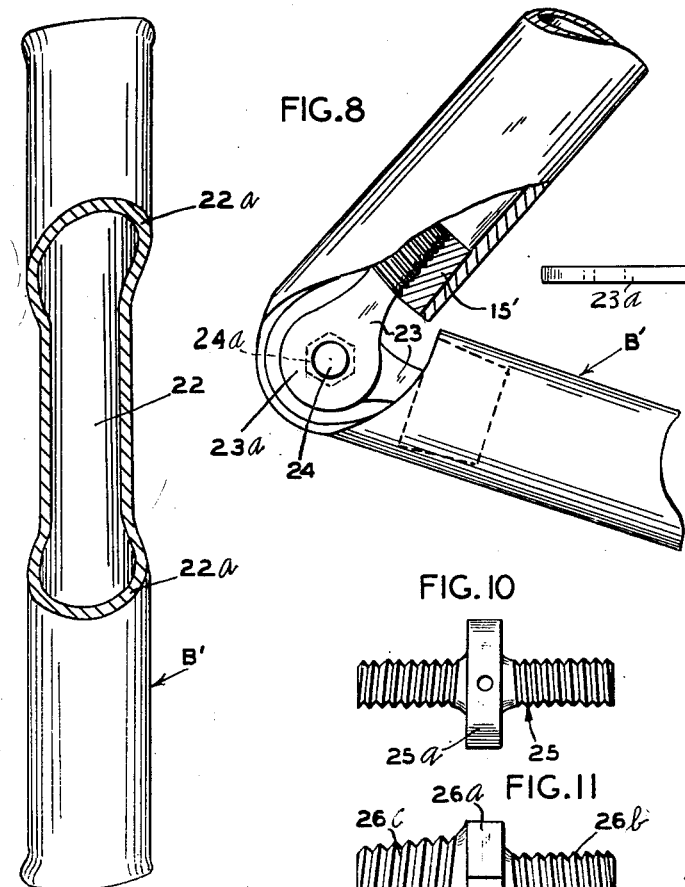
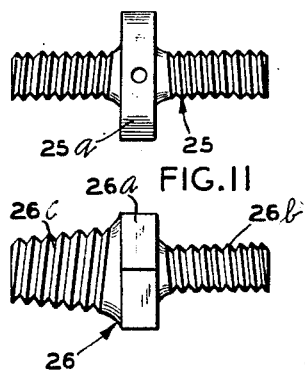
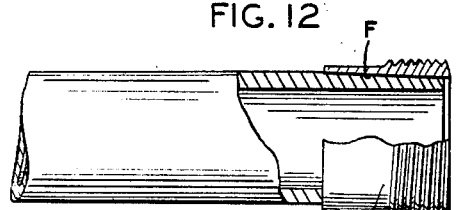
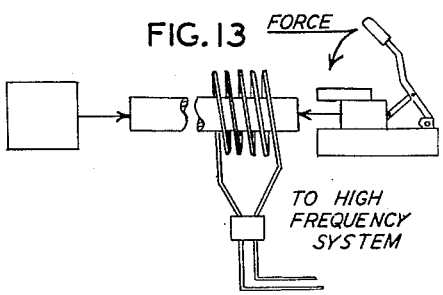
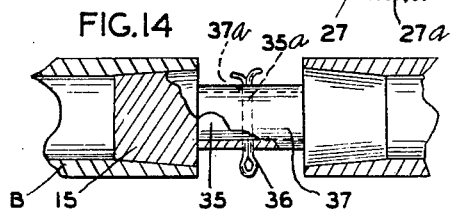
INVENTORS
FRANK DER YUEN
EMERY M. ELLINGSON
BY
*Williamson & Williamson*
ATTORNEYS

United States Patent Office 2,703,724
Patented Mar. 8, 1955

2,703,724

SECTIONAL BAMBOO BUILDING STRUCTURE WITH COUPLING

Frank Der Yuen, Running Springs, and Emery M. Ellingson, Inglewood, Calif.

Application August 11, 1949, Serial No. 109,714

5 Claims. (Cl. 287—127)

This invention relates to sectional building structure and couplings and connections therefor, and particularly to sectional construction kits utilizing as elements, sections of natural bamboo.

Bamboo, as a natural product, has an exceedingly efficient strength-to-weight ratio, offering not only flexural strength, but in the larger growths, stiffness and rigidity. Its mass is distributed in the form of a generally tubular shell with reinforcing, natural bulkheads disposed at certain spaced intervals. Such a general structure has been fully appreciated as giving optimum strength-to-weight ratios in the development of the so-called "monocoque" and "semi monocoque" construction developed in structural aircraft design. This "monocoque" construction employs a relatively thin, tubular shell with reinforcing bulkheads disposed therein at given spaced intervals.

Extensive use of bamboo for structural frame purposes in making various devices, building structures and the like, has been very limited due to the impracticability of coupling bamboo sections together to form strong, rigid, joints other than by the primitive means of using twisted bamboo thongs. Nails, bolts, screws and a wide variety of cements, have been attempted as couplings for structurally joining bamboo sections but aside from rather expensive joints such as are used in fishing poles which have only a very limited applicability, mechanical fastenings have been in general, failures because of the tendency of the bamboo to split from bulkhead to bulkhead and because of inability in obtaining any cement satisfactory for strength requirements.

It is an object of our invention to provide sectional construction kits and sectional building structure, including couplings for making and setting up various devices, building frames, furniture, racks, and educational construction kits for children, where the principal elements constitute light, tubular members, preferably in the form of natural bamboo.

A further object is the provision of a highly efficient and exceedingly strong coupling structure adapted very readily, without the use of tools, to rigidly interconnect bamboo, or other fibrous tubular sections, in various aligned and angulated relations.

Still another object is the provision of a simple, but highly efficient, process for producing and permanently securing elements of said coupling structure to the natural ends of tubular, fibrous sections, such as bamboo.

Another object is the provision of sectional building structures with couplings, which opens up a very extensive use for bamboo assemblies in home use, farm use, sportsmen's use, and in the manufacture of mechanical devices, as well as in provision of construction kits for children, where devices, building frames, and furniture of sufficient size, may be set up by the children, enabling them to actually utilize and fully appreciate the numerous devices capable of being assembled.

These and other objects and advantages of our invention will more fully appear from the following description made in connection with the accompanying drawings wherein like reference characters refer to similar parts throughout the several views, and in which—

Fig. 1 is a fragmentary view with some portions broken away, showing two natural bamboo construction sections axially aligned and firmly secured together by an embodiment of our invention;

Fig. 2 is a fragmentary, exploded view, illustrating the parts assembled in Fig. 1;

Fig. 3 is a cross-section taken on the line 3—3 of Fig. 1;

Fig. 4 is a front elevation, with some portions broken away, showing bamboo sections coupled together in various relations through certain of our fastening and coupling elements;

Fig. 5 is a fragmentary side elevation showing another form of fastening mechanism for engagement with a coupling, where a section is secured to another section of bamboo perpendicularly thereto;

Fig. 6 is a cross-section taken on the line 6—6 of Fig. 5;

Fig. 7 is a front elevation of a special bamboo section adapted to be utilized with another of our coupling mechanisms for obtaining various angulations in the relation of two sets of bamboo tubes;

Fig. 8 is a side elevation, with some portions broken away, of the assembled coupling and bamboo sections referred to in the description of Fig. 7;

Fig. 9 is a side elevation of one of the pivot couplings detached;

Fig. 10 is a side elevation of another type of connector, or coupling, for securing two sections of bamboo in axial alignment;

Fig. 10a is an end elevation of the connector shown in Fig. 10;

Fig. 11 is a side elevation of a hexagon connector adaptor for connecting a section of bamboo with a standard pipe connection;

Fig. 11a is an end elevation of the connector adaptor shown in Fig. 11;

Fig. 12 is a side elevation, with some portions broken away, showing another type of fastening surrounding the end of a natural piece of bamboo;

Fig. 13 is a diagrammatic view illustrating a type of apparatus suitable for carrying out our method; and Fig. 14 is a side elevation with portions broken away and shown in section illustrating another type of "quick-connect-and-disconnect" attachment fitting adapted for certain installations including concrete reinforcements.

Referring now to the elements and parts shown in Figs. 1 to 3 inclusive, bamboo sections B embodying the usual natural structure of true bamboo with the natural bulkheads b interposed between the predetermined lengths thereof, are illustrated as coupled together in axially aligned rigid fashion by an efficient form of our fastening and coupling mechanism. The mechanism for each end of each bamboo building unit B comprises a fixed plug sleeve 15 tapered slightly from its outer to its inner end, such taper preferably being within a range of from ½ to 8 degrees angulation from cylindrical contour.

In preparing our construction, the substantially internal peripheral wall of the ends of the bamboo section are abraded by rotary file or other abrasive or cutting means to provide a truncated conical plug seating surface complementary in shape and tapered to the taper of the plug 15. The plug sleeves 15 are preferably but not necessarily tapped axially thereof to receive the threaded ends of double coupling bolts 16. The coupling bolt 16 shown in Figs. 1 and 2 has a hexagonal nut 16a fixed or integrally formed substantially intermediate the ends thereof to facilitate turning of the bolt. Both ends of the bolt 16 as shown in Figs. 1 and 2, are provided with right hand threads for engagement with the tapped bores of the plug sleeves 15. Said plug sleeves 15 are provided at their extremities with countersunk or recessed portions 15a for accommodating, when two bamboo sections are joined together, the nut 16a although in other forms of our invention, the sleeves are not countersunk in order that the nut of the coupling bolt may be fully utilized to space and secure two structural sections together. Compressible spacing washers 17 constructed of fabricated rubber or other suitable material may be utilized between the annular shoulders of nut 16a and the countersunk terminal seats in the outer ends of plug sleeves 15.

We supply various coupling elements for union and combination with our fastening elements or plug sleeves 15 such as elbows, T's, radial connectors and other union couplings. In Fig. 4, the use of several of such couplings or connections is illustrated with a plug sleeve and bolt connector structure varying slightly from the form disclosed in Figs. 1 and 2. The plug sleeves 15' are not countersunk at the ends thereof, for receiving portions of the bolt turning nut 16a but preferably terminate in flat surfaces lying flush with the extremities of the bamboo section B. Furthermore, one end of each bamboo section has a plug sleeve 15' with right hand thread while the opposite end has a plug sleeve 15' tapped with left hand thread. The coupling bolt 16 has the nut 16a intermediate of the ends thereof but is provided at one end with a right hand external thread and at the opposite end with a left hand external thread.

With such structure, when the double ended bolt is applied, two joined sections or a section of the coupling are drawn tightly together with the nut spacing the extremities thereof a slight distance apart. In Fig. 4, an elbow coupling 18 is shown connecting an upright bamboo section with a horizontal section lying substantially in the same general plane. This elbow is preferably constructed of light metal such as aluminum alloy having thickened terminal portions tapped properly to receive threaded ends of coupling bolts 16. The elbow also as shown, has a tapped bore 18b formed transversely thereof by which another bamboo section may be joined extending perpendicularly to both sections, upright and horizontal.

Fig. 4 also illustrates the use of a three way or radial coupling union 19 of generally triangular configuration having three thickened and reinforced sockets appropriately tapped to receive the ends of coupling bolts 16 and in this union, the member 19 is provided with a tapped transverse bore 19b for receiving ends of coupling bolts 16 for joining a bamboo section extending perpendicularly to the general plane defined by the several axes of the bores.

In Figs. 7 to 9 inclusive, we illustrate another form of angular structure and coupling wherein a specially prepared bamboo section B' is supplied, having an intermediate portion longitudinally slotted as indicated in Fig. 7 to leave tubular, somewhat slanted edges 22a and an interconnecting longitudinal strip 22. Plug sleeves 15' of similar structure to those previously described are inserted and rigidly secured to the opposing socket portions of the special bamboo section preferably through the practice of our improved method hereafter disclosed and then a pair of eye bolts 23 are threaded into plugs 15', left and right hand eye bolts being provided having flatted ears 23a which are adapted to lie face to face and to occupy the thickness of the diameter of bolts 23 when juncture is made, as shown in Fig. 8. The connection portion 22 of the bamboo is steamed or otherwise made flexible to facilitate bending to the desired angulation. A pivot member 24 joins the two eye bolts and preferably is provided with a threaded clamping nut 24a to fixedly secured bolts 23 in various desired relations.

In Figs. 10 and 10a, a still different screw or bolt connector utilizing at terminal portions, right and left hand threads is shown, having a central cylindrical collar 25a in place of the hexagonal nut used in the form previously described. The collar may be turned with a half circular pin wrench.

In Figs. 11 and 11a, a connector adaptor 26 for joining sections of bamboo with conventional standard pipe fittings is illustrated having a central hexagonal nut 26a and having one of its ends 26b provided with right hand threads for connection with one of the plug sleeves 15. The other extremity of the adaptor has tapered threads 26c for fitting standard pipe couplings.

In Fig. 12, we show an alternative type of fastening for the ends of the bamboo sections. Here, a collar sleeve 27 is internally tapered slightly from inner to outer end and the bamboo section B is exteriorly machined or abraded to present a complementary formed, slightly tapered outer end to receive the collar 27. Collar 27 is provided adjacent its outer portion with external right hand threads 27a.

In Figs. 5 and 6, we illustrate another structure and method of connecting additional sections angularly with a section B of bamboo. Here, the bamboo section is drilled diametrically and then provided by abrasion with truncated conical internal shoulders in opposed, aligned relation which taper inwardly slightly for receiving plug sleeves 20. The plug sleeves 20 have concentrically disposed and frictionally retained thereon, a cylindrical spacer sleeve 21 which may be internally threaded at its end portions for receiving the threaded ends of bolt connectors 16. If the spacer sleeve 21 is not threaded, its inside diameter is sufficiently large so as to permit a continuous bolt connector to pass through.

It is to be understood that all of the operating elements of our fastening and coupling means including the plug sleeves 15 and 15', collar sleeves 27, the coupling bolts 16, 16' and 25, connector bolt adaptor 27, and the eye bolts 23 as well as all other interconnecting coupling elements such as the elbows 18 and angular and radially socketed members 19 are constructed from very strong, rigid and preferably light material such as aluminum alloys or reinforced plastics for certain light installations.

It is further understood that our structure, as an essential feature, comprises a preferably permanent welding or bonding of the tapered fastening elements including the plug sleeves 15, 15' and collar sleeves 27 with the tapered frusto conical seats formed in the ends of the bamboo or other fibrous tubular sections.

Our invention includes the discovery and provision of a simple but highly efficient process for in effect welding the metallic fastening elements to the terminal portions of the bamboo sections.

We have discovered that an effective bond may be formed between the said plug and collar fastening elements and fibrous material such as tubular bamboo through the use of recently developed thermal setting bonding materials where pressure is applied with simultaneous application of heat to the faying surfaces during a short setting period. In carrying out our process as has been previously stated, the end portions of the bamboo sections are internally abraded to form inwardly tapering plug receiving seats. The tapered plug, having external frusto conical surfaces of complementary shape to said seats, are then encircled on the peripheries thereof with preferably a single ply of a thermal setting bonding film F which readily adheres to said surfaces. Thereafter, the plugs are inserted longitudinally and axially into the ends of the bamboo sections and are longitudinally thrust inwardly preferably by the application of a force applied inwardly on the plugs. The portion of the unit surrounding the film applied plug is then subject to deep penetrating heat such as radio frequency heating for a short period, causing the bonding material to initially melt, thin and then permanently set during application of axial pressure longitudinally of the plug and bamboo section.

The character of the bond is determined by the principal factors of pressure at the faying surfaces, temperature and time.

Purely as a commercially successful example, we have found that in fastenings for bamboo sections ranging from one half to one and one fourth inches in external diameter and having seats or faying surfaces provided with a three to four degree taper, a ten pound force applied longitudinally upon the plug with subjection of the terminal portion of the entire unit to induction heating at approximately 450 kilocycles per second within a coil of five convolutions of a diameter equal to two and one half times the diameter of the section, produces a bond having all the characteristics of welding when in input power of approximately three and one half kilowatts is maintained for a period approximating twenty seven seconds. While a number of thermal setting films may be utilized, we have obtained excellent results with one layer of a special bonding tape manufactured by Minnesota Mining and Manufacturing Company of Saint Paul, Minnesota, which is commercially sold as thermal setting film R–612, thickness 0.004.

A fastening or more specifically, a bamboo section terminal with plug sleeve welded thereto according to the teaching of our method, has repeatedly demonstrated in destruction tests an ability to withstand an axial load of approximately twenty eight hundred pounds and a shearing stress at the bond approximating fifty nine hundred pounds per square inch.

In Fig. 13 we diagrammatically illustrate the important steps in carrying out our method. Force may be applied axially and inwardly against the ends of the fastening members after the thermal setting bonding material is applied to one of the faying surfaces and simultaneously therewith the parts to be welded or bound together, including the frusto-conical seat formed in the bamboo, the rigid plug or fastening collar as the case may be and the layer of binding material, are subjected to the deep penetrating rays of heat from an induction coil connected with a high frequency induction unit.

In securing our external collar sleeves 27 illustrated in Fig. 12 to the bamboo sections, the essential steps of our herein described method are carried out with the thermal setting film F initially applied externally of the tapered seat on the terminal portion of the bamboo section.

It will be seen that with the several forms of our fastening members such as the internally threaded plug sleeves 15 and 15', the externally threaded collar sleeves 27 and the diametrically or transversely disposed fastening members including a pair of axially disposed opposing sleeves 20 with the internally threaded spacing sleeves fixed therein, are all provided with threaded coupling connection elements, internal or external as the case may be. These connection elements in a supply or set of our sectional construction material, are usually adapted to threadedly interconnect and rigidly secure with the various types of double ended connector bolts, unions, elbows, T's and radially socketed elements such as the union 19.

It will of course be understood that in many uses of our sectional building material threaded interconnection of the fastening elements of the adjacent sections or the couplings between sections or units, corner couplings and the like, need not be rigid and in fact in some instances, are preferably of a non-rigid type. In Fig. 14, we illustrate two sections of bamboo coupled together with a "quick-connect and disconnect" type of construction where the fastening plug 15 on one of the sections is provided with an axial cylindrical pin 35 which is shown as medially apertured at 35a to receive a cotter pin or shear pin 36. The fastening plug 15 of the right hand bamboo section is provided at its outer end with a rigid axial sleeve 37 having an internal diameter for telescoping snugly over the pin 35 of the other section. Element 37 is diametrically drilled to form apertures 37a adapted to register with apertures 35a when the terminal sleeve 37 is in abutment with the extremity of the opposed end of the other fastening member.

From the foregoing description, it will be apparent that with our sectional building construction including couplings, various devices, frames, chassis and building constructions may be formed in compliance to various requirements including transverse rigid connection with the tubular sections, angulated connection of the tubular sections and the corner joints involving coupling connection between three or more bamboo or other tubular sections.

Where connector elements such as the double ended connector bolts 25 are used having right and left hand threads and where plug sleeves 15' of the type shown in Fig. 4 are utilized, the connector bolt when turned, is interposed directly against the ends of the bamboo sections and when turned, serves to longitudinally or axially draw the sections together into rigid connection.

It should be pointed out that with radially socketed couplings such as the type 19 shown in Fig. 4, the spokes of wheels may be provided and a suitable rim or felloe supplied for connection with the outer ends thereof.

Our invention is particularly adapted for utilizing the highly advantageous natural structural material bamboo. With our sectional structure when rigid metallic fastening members are utilized with metallic coupling members, actual buildings, frame work, chassis for vehicles and other frame, may be efficiently and relatively inexpensively made from our structure. The possibilities of use of bamboo for furniture, fencing, racks, home appliances, is substantially unlimited. The structure has particular interest and advantage for children in its application to construction kits where usable, substantially full size devices may be built and actually used by the child. Play houses, stilts and play furniture as well as gymnasium equipment may be constructed by children.

Our improved structure is equally applicable to various devices, frames and sectional poles and supports for sportsmen and an adequate supply of the sectional construction provides a farmer with facilities for building and erecting a number of devices and constructions valuable to the farm.

It will of course be understood that various changes may be made in the form, details, arrangement and proportions of the parts without departing from the scope of our invention.

What we claim is:

1. In sectional building construction, a unit comprising a section of bamboo having an open tubular end, said end having some of the bamboo material removed internally therefrom and shaped for some distance inwardly to form a slightly tapering frusto-conical plug seat, a rigid metallic plug member having a complemental frusto-conical periphery wedgedly fitting said seat, a cured layer of thermal setting bonding material interposed between said plug and said seat and permanently affixing said plug to the end of said bamboo section and reinforcing the same so as to withstand imparted stresses and strains, and said plug having a coupling element.

2. In sectional building construction, a substantially rigid tubular unit comprising a fibrous material section, said section having opposed openings formed therethrough at opposite sides of the peripheral wall, the edges defining said openings constituting truncated conical seats tapered inwardly slightly from the exterior of said section, rigid plug members having complemental frusto-conical peripheries wedgedly fitting said seats, layers of thermal setting bonding material interposed between said plug members and said seats and permanently affixing said plug members to said section so as to withstand imparted stresses and strains, and said plug members having coupling elements for jointly connecting said section with other elements.

3. In a sectional building construction, a substantially rigid tubular unit comprising a fibrous material section having a frusto-conical seat formed by removing some of the material therefrom, a rigid fastening member affixed to said seat and having a complemental frusto-conical faying surface wedgedly fitting said seat, a thin layer of thermal setting bonding material interposed between said seat and said faying surface and permanently affixing said fastening member to the seat so as to withstand imparted stresses and strains, and said fastening member having an element constructed for ready connection with the fastening element of another unit or with various other coupling elements.

4. The sectional building construction as defined in and by claim 3 wherein the tubular unit is bamboo, and the rigid fastening member is metallic.

5. In sectional building construction utilizing principally bamboo sections, a plurality of readily connectible units each comprising a section of natural bamboo having an open tubular end with a natural bamboo transverse partition disposed inwardly of said tubular end, said tubular end having some of the material removed therefrom adjacent its extremity to form a frusto-conical seat of slight taper, a rigid metal fastening member affixed to said frusto-conical seat and having a complemental, frusto-conical faying surface wedgedly fitting said seat, a thin layer of cured and set, thermo-setting bonding material interposed between said seat and said faying surface and substantially covering the peripheries of said seat and faying surface and permanently affixing said fastening member to said seat so as to withstand imparted stresses and strains, and said fastening member having an element constructed for ready connection with the fastening element of another unit or with various other coupling elements.

References Cited in the file of this patent

UNITED STATES PATENTS

| Number | Name | Date |
| --- | --- | --- |
| 102,443 | Smith | Apr. 26, 1870 |
| 192,718 | Smith | July 3, 1877 |
| 932,744 | Adams | Aug. 31, 1909 |
| 938,137 | Goetz | Oct. 26, 1909 |
| 990,599 | Sandell | Apr. 25, 1911 |
| 1,008,002 | Allen | Nov. 7, 1911 |
| 1,601,029 | Ligonnet | Sept. 28, 1926 |
| 1,837,553 | Key | Dec. 22, 1931 |
| 1,867,226 | Martin | July 12, 1932 |
| 2,218,175 | Mack | Oct. 15, 1940 |
| 2,242,427 | Heance | May 20, 1941 |
| 2,306,151 | Bailey | Dec. 22, 1942 |
| 2,401,987 | Taylor et al. | June 11, 1946 |
| 2,472,708 | Jones | June 7, 1949 |
| 2,478,857 | Brown et al. | Aug. 9, 1949 |
| 2,502,340 | Pickens | Mar. 28, 1950 |
| 2,584,133 | Koochembere | Feb. 5, 1952 |